United States Patent [19]

Johnson, III et al.

[11] 3,916,381

[45] Oct. 28, 1975

[54] LOOP ARRANGEMENT TO TEST A REMOTE SUBSCRIBER'S DROP FROM A CENTRAL OFFICE VIA A PCM SUBSCRIBER CARRIER SYSTEM

[75] Inventors: Lehman Holson Johnson, III; Thomas Paul Maryscuk, both of Raleigh, N.C.

[73] Assignee: International Telephone and Telegraph Corporation, Nutley, N.J.

[22] Filed: Sept. 18, 1974

[21] Appl. No.: 507,103

[52] U.S. Cl. .............................. 340/150; 340/253 R

[51] Int. Cl.[2] .............................. H04M 3/22

[58] Field of Search .............................. 340/150, 253 R; 179/175.2 C

[56] References Cited

UNITED STATES PATENTS 3,770,912 11/1973 Alford .............................. 340/253 X

*Primary Examiner*—Harold I. Pitts
*Attorney, Agent, or Firm*—John T. O'Halloran; Menotti Lombardi, Jr.; Alfred C. Hill

[57] ABSTRACT

The tests to be carried out are initiated at the central office by setting a test flip-flop which couples a test signal to the digital system. The test signal starts the subscriber end of the arrangement by activating a clock which clocks a divider chain which in turn drives two relays in the proper sequence to sequentially test the subscriber's drop for a ground to either of the tip or ring conductors, a short between the tip and ring conductors and a foreign battery coupled to either of the tip or ring conductors. The relays connect the tip and ring conductors of the drop under test to the proper one of two tandem connected low pass filter and comparator circuits. Drop test logic stores the results of the individual test and applies them to the digital system for reporting back to the central office. When the results on the digital system are received at the central office, the test results are visually displayed. When the subscriber end finishes sending the test results, and end of test reset circuit resets the test flip-flop ending the test.

10 Claims, 5 Drawing Figures

TRUTH TABLE

| TEST | K1 | K2 | FAULT DATA |
|---|---|---|---|
| GROUND | 0 | 0 | 1 |
| SHORT | 1 | 0 | 0 |
| FOREIGN BATTERY | 0 | 1 | 1 |

LOOP ARRANGEMENT TO TEST A REMOTE SUBSCRIBER'S DROP FROM A CENTRAL OFFICE VIA A PCM SUBSCRIBER CARRIER SYSTEM

BACKGROUND OF THE INVENTION

This invention relates to subscriber digital carrier systems including pulse code modulation (PCM) and delta modulation type code carrier systems and more particularly to arrangements to test the operation of such systems.

The looped voice frequency testing of a subscriber carrier system from the central office has become fairly common place. However, with such looped testing only the carrier portion of the overall circuit is verified.

SUMMARY OF THE INVENTION

An object of the present invention is to provide a looped test arrangement to test a remote subscriber drop from a central office via a digital subscriber carrier system.

Another object of the present invention is to enable the ITT T-324S subscriber PCM carrier system to detect faults at a remote subscriber drop and transmit the conditions of such a drop back to the central office via the PCM bit stream.

The T-324S system does employ a looped voice frequency testing, but carries this testing one step further by testing the actual drop (ring and tip conductors) to the subscriber telephone to enable a testing of the entire facility for proper working order including the drop to the subscriber telephone.

A feature of the present invention is the provision of a looped test arrangement connected to a digital subscriber carrier system operating during the synchronization time of the digital system to test from a central office a remote subscriber's drop including ring and tip conductors for a ground condition on either of the ring and tip conductors, a short condition between the ring and tip conductors, a foreign battery condition on either of the ring or tip conductors, or a no fault condition comprising: the central office including first means coupled to the digital system to apply a test signal to the digital system for transmission to the remote subscriber's end of the digital system; and second means coupled to the digital system to receive signals indicative of the conditions of the drop and to display the conditions of the drop; and subscriber equipment at the remote subscriber's end of the digital system including third means coupled to the digital system responsive to the test signal to generate different sequential clock signals to enable sequential testing of the drop for the ground condition, the short condition and the foreign battery condition, fourth means coupled to the drop, the third means and the digital system responsive to the sequential clock signals to sequentially test the drop for the ground condition, the short condition and the foreign battery condition and to transmit a binary level indicative of the condition of the drop on the digital system to the second means, and fifth means coupled to the fourth means and the digital system to detect a no fault condition in the fourth means and to transmit a no fault indication on the PCM system to the second means.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

While the testing arrangement utilized with the T-324S system employs a looped voice frequency testing to determine the carrier channel performance, the voice frequency and signaling performance, with the tests being processed over the channel under the test, the present invention is directed to the subscriber's drop test arrangement wherein the testing commands and resulting condition of the drop are sent and received within the framing or synchronizing code format of the T-324S system independent of the carrier channel.

While the testing arrangement of this invention is directed to employment with the ITT T-324S subscriber PCM carrier system, it is to be understood that the testing arrangement of the present invention will operate in an identical manner in a delta modulation code type carrier system.

The drawings only illustrate the pertinent portions of the central office equipment and subscriber end equipment of the drop testing arrangement of the present invention. The following tests for each drop is performed by the arrangement of the present invention. (1) Ground on the tip or ring conductor, (2) a short between the tip and ring conductor, and (3) a foreign battery on either the ring or tip conductor.

The ground test will display a fault if a leakage path from either the tip or ring conductor to ground is less than 20 kilohms.

The short test will display a fault if the leakage path from tip to ring conductor is less then 8 kilohms.

The foreign battery will display a fault if a foreign voltage source generates greater than 3 milliamps into either the tip or ring conductors when they are referenced to ground.

If none of the aforementioned faults are evident on the subscriber drop under test, a NO FAULT lamp will be illuminated.

Figure 1:
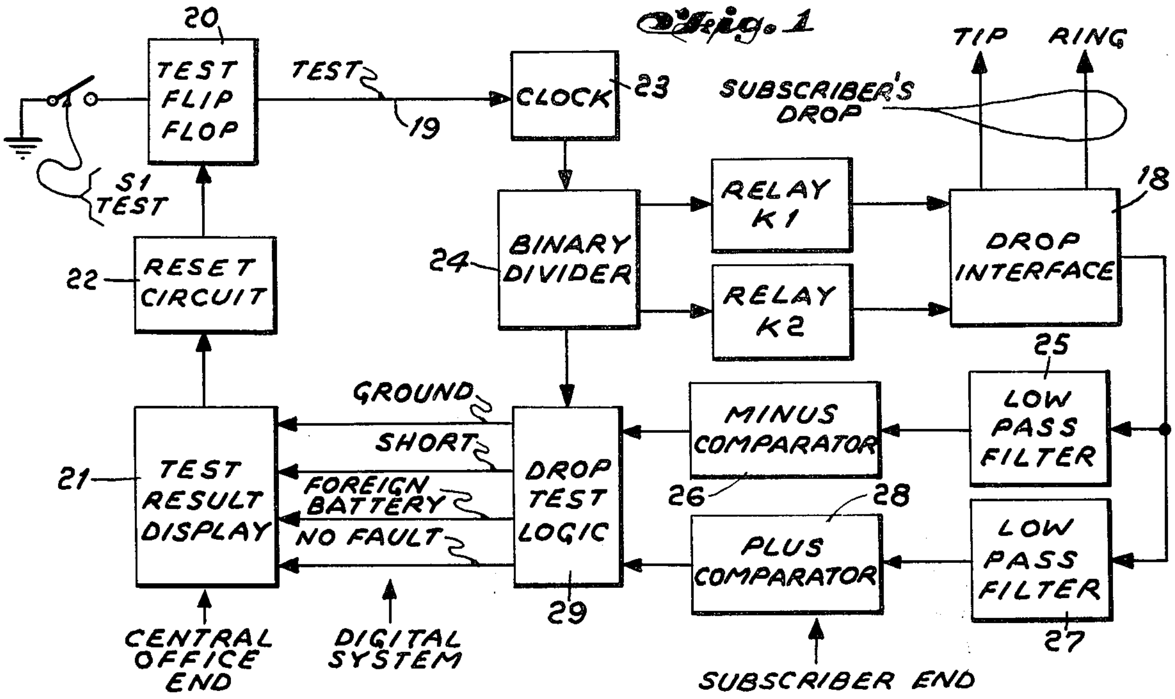
FIG. 1 is a block diagram of the complete testing arrangement according to the principles of the present invention.

Referring to FIG. 1 the central office end of the testing arrangement of the present invention includes a test flip-flop 20 which is placed in a set condition when switch S1 is closed. The test line 19 will then go high starting the operation of the subscriber end equipment of the test arrangement. When the subscriber end has finished testing the subscriber drop, the results are sent to the test result display 21 by reporting lines. The test results are displayed visually at the central office. When the subscriber end finishes sending the test results, the end of test reset circuit 22 resets flip-flop 20 ending that test. When flip-flop 20 is reset the test signal goes low stopping the subscriber end test equipment.

At the subscriber end clock 23 is activated when the test line 19 goes high and clocks the binary divider chain 24 which in turn drives relays K1 and K2 in the proper sequence. The relays connect the tip and ring conductors of the subscriber drop under test by means of a drop interface 18 to the proper one of two circuits depending upon the test being performed. One of the two circuits includes a low pass filter 25 and a minus comparator 26. The other of the two circuits includes low pass filter 27 and plus comparator 28. The drop test logic 29 stores the results of the individual tests and applies the results to the reporting lines for connection back to the central office for eventual display on display 21. It should be understood that while the invention is being described with reference to test line 19 and reporting lines these lines in effect are bit positions within the synchronizing code format of the PCM system involved.

Figure 3:
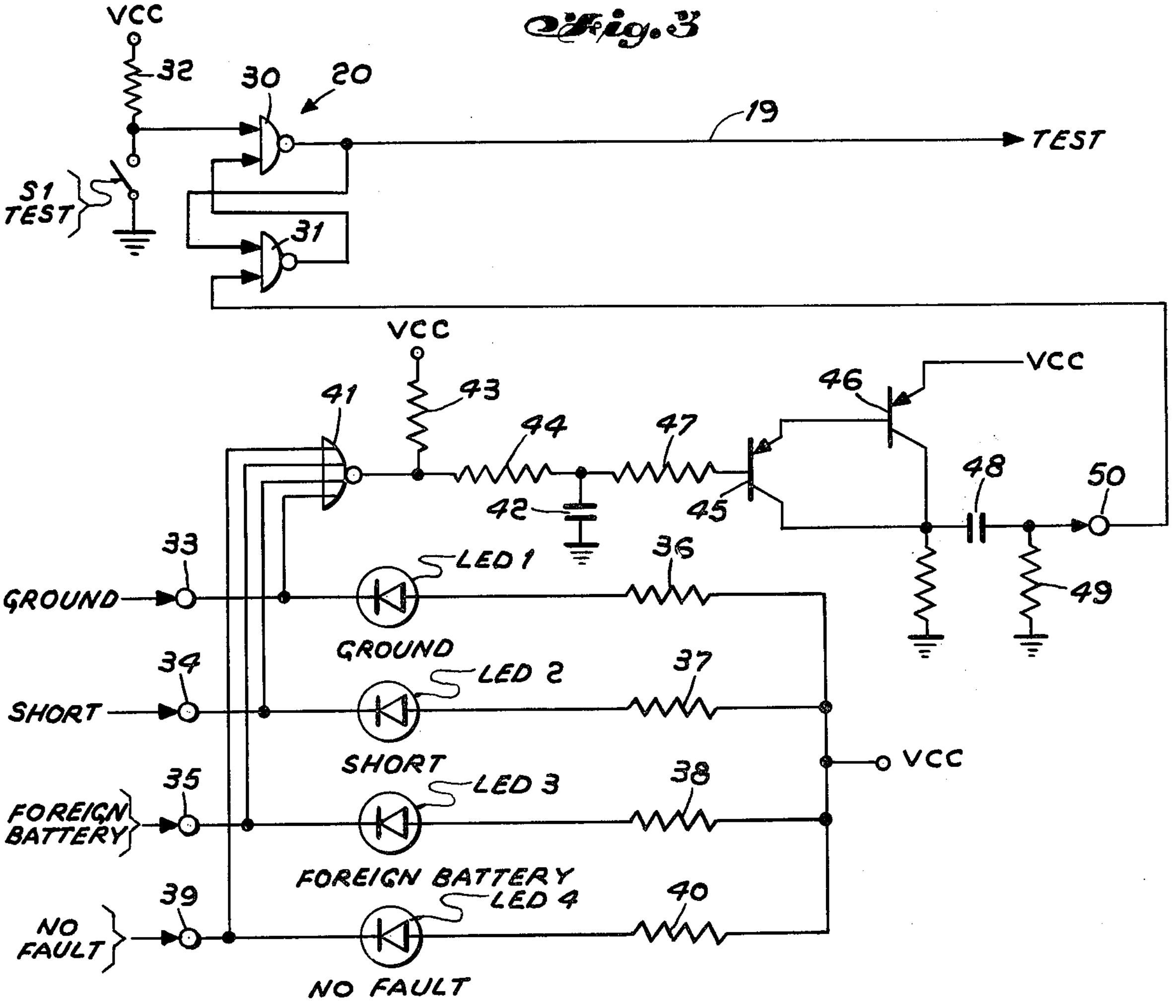
FIG. 3 is a logic diagram of the central office end of the test arrangement in accordance with the principles of the present invention.

Referring to FIG. 3 test flip-flop 20 includes NAND gates 30 and 31 which are activated by closing switch S1. Pull-up resistor 32 holds the set input high. When switch S1 is closed the input of gate 30 goes low setting the flip-flop and the test line 19 goes high.

When the subscriber end equipement reports, the faults are reported through the GROUND, the SHORT and the FOREIGN BATTERY reporting lines. The signals on these lines are inverted by NOT gates 33, 34 and 35, respectively, and light their associated light emitting diodes LED1–LED3 via current limiting resistors 36–38, respectively. Any number of these faults may be reported during a testing cycle. If no faults are found, the NO FAULT signal reports that no fault was found. This signal is inverted by NOT gate 39 to light emitting diode LED4 via current limiting resistor 40.

All of the reporting signals at the output of the NOT gates are coupled to a NOR gate 41. This gate output goes high when any of the reporting signals are reporting. This allows capacitor 42 to charge up to voltage VCC via resistors 43 and 44. Transistors 45 and 46 are turned off and their collectors are at ground. When the reporting signal goes low, the output of gate 41 goes low. After a time delay, transistors 45 and 46 turn on via resistors 44 and 47. Thus, the collectors of transistors 45 and 46 goes to voltage VCC and this signal is differentiated by capacitor 48 and resistor 49. The signal is inverted by NOT gate 50 and is fed to gate 31. This resets flip-flop 20 setting the test signal low. When the test signal goes low the equipment at the subscriber end stops its tests and resets to its start setup.

Figure 4:
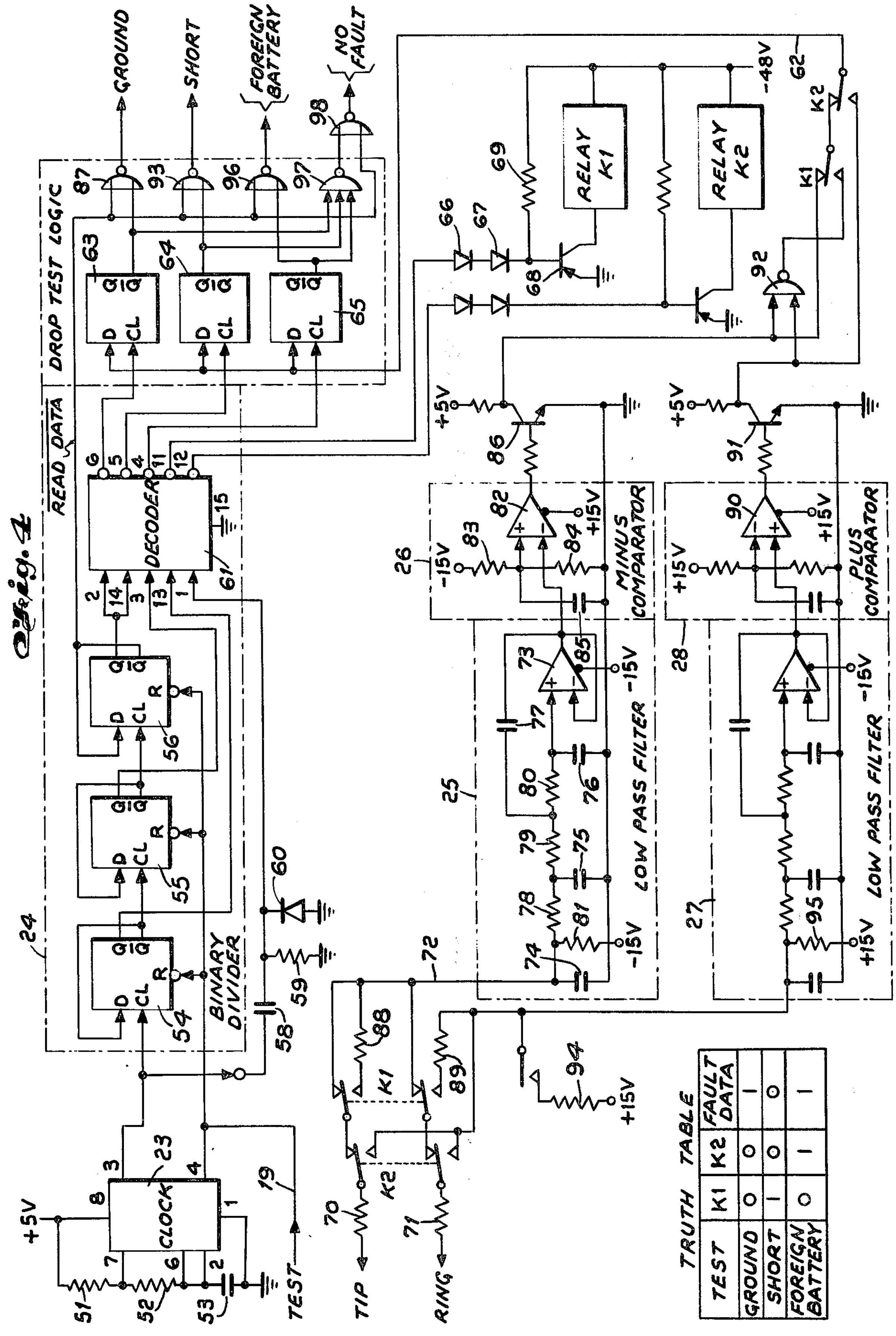
FIG. 4 is a logic diagram of the subscriber end of the test arrangement in accordance with the principles of the present invention.

Referring to FIG. 4 there is illustrated therein the equipment at the subscriber end of the test arrangement of the present invention. When test line 19 goes high (logic 1) clock 23 is started and clocks binary divider 24. Clock 23 has a period of operation of 1.4 seconds which is determined by resistors 51 and 52 and capacitor 53. Clock 23 drives the binary divider 24 including D-type flip-flop stages 54, 55 and 56. At the same time clock 23 drives the one shot circuit including NOT gate 57, capacitor 58, resistor 59 and diode 60. The outputs from the divider 24 and the one shot circuit drive the dual two-line to four-line decoder 61. The operation of the circuit components just described with reference to FIG. 4 is shown by the timing diagram of FIG. 5. The clock signals on output pins 6, 5 and 4 of decoder 61 are used to clock the test results on line 62 into the storage D-type flip-flops 63, 64 and 65. The output on pins 11 and 12 of decoder 61 are used to drive relays K1 and K2.

A high or 1 on pin 11 of decoder 61 will cause diodes 66 and 67 to be forward biased and hold transistor 68 off. A low on this same pin will allow the pull-up resistor 69 to turn transistor 68 on energizing relay K1. Relay K2 is operated in a similar fashion by a low on pin 12 of decoder 61.

During the GROUND test, where relays K1 and K2 are de-energized and their associated contacts are in the position illustrated, the tip and ring conductors are connected through resistors 70 and 71 and are then connected together with the contacts of relays K1 and K2 in the position shown at point 72 and then on to the active low pass filter 26 including differential amplifier 73, capacitors 74, 75, 76 and 77 and resistors 78, 79 and 80. This low pass filter 26 provides greater than 70 dB (decibal) rejection to 60 hertz volts induced on to the drop by the power distribution lines. A −15 volts is connected to the input of low pass filter 26 through resistor 81. The output of low pass filter 26 is determined by the current flowing through resistor 81 which is dependent on a fault ground (less than 20 kilohms) on the tip or ring conductors. Such a fault will increase the −15 volts output of differential amplifier 73 to something more positive than −7.5 volts.

The decision point of differential amplifier 82 of the minus comparator 26 is set at −7.5 volts by the voltage divider including resistors 83 and 84 filtered by capacitor 85. The ground fault voltage (more positive than −7.5 volts) flips the comparator 26 output from +15 volts to −15 volts, biasing off transistor 86 which produces a high on the drop data line 62 through the contacts of relays K1 and K2 in the position illustrated (relays not activated). This data is clocked into the GROUND storage flip-flop 63 by the clock signal on pin 6 of decoder 61.

The high appears as a low at the $\overline{Q}$ output of flip-flop 63. This low along with READ DATA low at NOR gate 87 will cause the GROUND fault reporting line to go high.

Figures 2, 5:
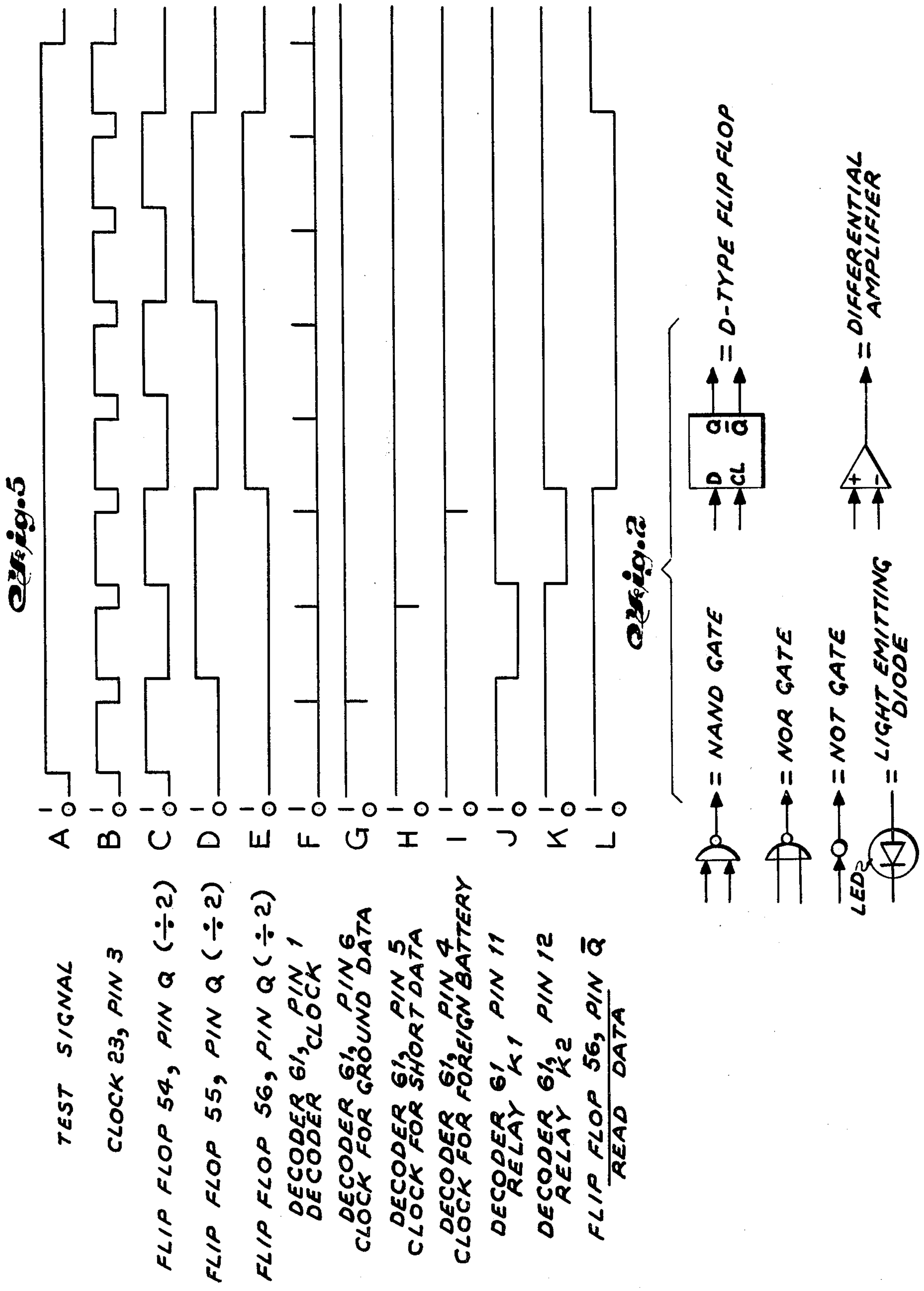
FIG. 2 provides the definition of the various symbols employed in the logic circuitry of FIGS. 3 and 4.
FIG. 5 is a timing diagram illustrating the operation of FIG. 4.

The data on the GROUND reporting line as well as the other reporting lines will remain displayed and accurate during the READ DATA pulse of Curve M of FIG. 5.

During the SHORT test, relay K1 is operated and both the plus and minus comparators 26 and 28 are connected to the tip and ring conductors of the drop under test via their respective active low pass filters 25 and 27. The "loop" is formed by resistors 70, 71, 88, 89, 81 and 95 so that a loop between the tip and ring conductors of less than 8 kilohms will produce a SHORT fault condition. Plus comparator 28 operates in a manner similar to the minus comparator 26 described above with the exception that +15 volts is used as the sense voltage and the actual comparator in the form of differential amplifier 90 is inverted. A SHORT fault condition will cause the outputs of each of the comparators 82 and 90 to be −15 volts. As a result both transistors 86 and 91 will be off and the inputs to NAND gate 92 will all be high. The output from gate 92 will then be a low and connected via the associated contact of relay K1 to drop data line 62 hence to the SHORT storage D-type flip-flop 64. This data will be clocked into flip-flop 64 by the clock signal from pin 5 of decoder 61. The resulting low on the Q output of flip-flop 64 along with a READ DATA low on NOR gate 93 will produce a high on the SHORT reporting line.

During the FOREIGN BATTERY relay K2 is operated and plus comparator 28 is connected to the tip and ring conductors of the drop under test through the active low pass filter 27 and resistors 70 and 71. The sensitivity of plus comparator 28 is modified by resistor 94. A minus foreign voltage of sufficient potential to produce a 3 milliampere current through resistor 94 in parallel with resistor 95 is filtered by the active low pass filter 27 and forces the output of plus comparator 28 from +15 volts to −15 volts. In this condition transistor 91 is off and the drop data line 62 becomes high through the contacts of relay K2. This FOREIGN BATTERY data is clocked into storage flip-flop 65 by the clock signal at pin 4 at decoder 61. The $\overline{Q}$ output of flip-flop 65 is a low and when combined with a low READ DATA at NOR gate 96 the FOREIGN BATTERY reporting line will go high indicating a FOREIGN BATTERY fault.

If, after the first three tests, there have been no faults reported and stored in flip-flops 63–65, the output of NAND gate 97 will be low. When the READ DATA goes low after the third decoder clock signal from pin 4 of decoder 61 the output of NOR gate 98 will go high to indicate NO FAULT on the NO FAULT reporting line.

When the READ DATA signal goes high the data reporting lines will go low. When the data reporting lines go low, the test line 19 will go low under the control of the central office and stop the operation of clock 23.

Thus the drop from each subscriber channel to the subscriber telephone may be verified as to proper operation thereof.

The various gates, D-type flip-flops, differential amplifiers, the clock and the decoder can all be implemented by integrated circuit modules available from many integrated circuit module manufacturers, such as Texas Instruments, Inc.

While we have described above the principles of our invention in connection with specific apparatus it is to be clearly understood that this description is made only by way of example and not as a limitation to the scope of our invention as set forth in the objects thereof and in the accompanying claims.

We claim:

1. A looped test arrangement connected to a digital subscriber carrier system operating during the synchronization time of said digital system to test from a central office a remote subscriber's drop including ring and tip conductors for a ground condition on either of said ring and tip conductors, a short condition between said ring and tip conductors, a foreign battery condition on either of said ring or tip conductors, or a no fault condition comprising:

said central office including first means coupled to said digital system to apply a test signal to said digital system for transmission to said remote subscriber's end of said digital system, and second means coupled to said digital system to receive signals indicative of said conditions of said drop and to display said conditions of said drop; and subscriber equipment at said remote subscriber's end of said digital system including third means coupled to said digital system responsive to said test signal to generate different sequential clock signals to enable sequential testing of said drop for said ground condition, said short condition and said foreign battery condition, fourth means coupled to said drop, said third means and said digital system responsive to said sequential clock signals to sequentially test said drop for said ground condition, said short condition and said foreign battery condition and to transmit a binary level indicative of the condition of said drop on said digital system to said second means, and fifth means coupled to said fourth means and said digital system to detect a no fault condition in said fourth means and to transmit a no fault indication on said digital system to said second means.

2. An arrangement according to claim 1, wherein said first means includes a flip-flop coupled to said digital system to provide a binary 1 for a predetermined length of time as said test signal.

3. An arrangement according to claim 1, wherein said second means includes a display coupled to said digital system to display said conditions of said drop, and a reset circuit coupled between said display and said first means to terminate said test signal.

4. An arrangement according to claim 3, wherein said display includes four light emitting diodes, one for each of said conditions.

5. An arrangement according to claim 4, wherein said reset circuit includes a NOR gate coupled to each of said diodes.

6. An arrangement according to claim 1, wherein said third means includes a clock coupled to said digital system activated by said test signal, a three stage binary counter coupled to said clock, a one shot circuit coupled to said clock, and a decoder coupled to said counter and said one shot circuit to generate said clock signals.

7. An arrangement according to claim 1, wherein said fourth means includes a first relay coupled to said third means controlled by a first of said clock signals, a second relay coupled to said third means controlled by a second of said clock signals, a switching arrangement coupled to said ring and tip conductors controlled by said first and second relays, a first low pass filter coupled to said switching arrangement, a minus comparator coupled to said first filter, a second low pass filter coupled to said switching arrangement, a plus comparator coupled to said second filter, said first and second filters being coupled to said ring and tip conductors through said switching arrangement depending upon the test being performed, a first storage device coupled to said third means controlled by a third of said clock signals selectively coupled to said minus and plus comparators by said first and second relays to store said ground condition, a second storage device coupled to said third means controlled by a fourth of said clock signals selectively coupled to said minus and plus comparators by said first and second relays to store said short conditions, a third storage device coupled to said third means controlled by a fifth of said clock signals selectively coupled to said minus and plus comparators by said first and second relays to store said foreign battery condition, and first logic circuitry coupled to said third means and each of said first, second and third storage devices to read the contents of each of said first, second and third storage devices into said PCM system.

8. An arrangement according to claim 7, wherein said fifth means includes second logic circuitry coupled to said third means and each of said first, second and third storage devices to provide a no fault signal when there is a no fault condition stored in each of said first, second and third storage devices.

9. An arrangement according to claim 1, wherein said fifth means includes logic circuitry coupled to said third means and said fourth means to provide a no fault signal when there is a no fault condition for each of said ground, short and foreign battery tests.

10. An arrangement according to claim 1, wherein said first means includes a flip-flop coupled to said digital system to provide a binary 1 for a predetermined length of time as said test signal;

said second means includes a display coupled to said digital system to display said conditions of said drop, and a reset circuit coupled between said display and said first means to terminate said test signal;

said display includes four light emitting diodes, one for each of said conditions;

said reset circuit includes a NOR gate coupled to each of said diodes;

said third means includes a clock coupled to said digital system activated by said test signal, a three stage binary counter coupled to said clock, a one shot circuit coupled to said clock, and a decoder coupled to said counter and said one shot circuit to generate said clock signals;

said fourth means includes a first relay coupled to said decoder controlled by a first of said clock signals, a second relay coupled to said third means controlled by a second of said clock signals, a switching arrangement coupled to said ring and tip conductors controlled by said first and second relays, a first low pass filter coupled to said switching arrangement, a minus comparator coupled to said first filter, a second low pass filter coupled to said switching arrangement, a plus comparator coupled to said second filter, said first and second filters being coupled to said ring and tip conductors through said switching arrangement depending upon the test being performed, a first storage device coupled to said decoder controlled by a third of said clock signals selectively coupled to said minus and plus comparators by said first and second relays to store said ground condition, a second storage device coupled to said decoder controlled by a fourth of said clock signals selectively coupled to said minus and plus comparators by said first and second relays to store said short conditions, a third storage device coupled to said decoder controlled by a fifth of said clock signals selectively coupled to said minus and plus comparators by said first and second relays to store said foreign battery condition, and first logic circuitry coupled to the last stage of said counter and each of said first, second and third storage devices to read the contents of each of said first, second and third storage devices into said digital system; and said fifth means includes second logic circuitry coupled to the last stage of said counter and each of said first, second and third storage devices to provide a no fault signal when there is a no fault condition stored in each of said first, second and third storage devices.

* * * * *